US010337235B2

(12) United States Patent
McHugh et al.

(10) Patent No.: US 10,337,235 B2
(45) Date of Patent: Jul. 2, 2019

(54) INSULATING GLASS UNIT AND A METHOD AND APPARATUS FOR FILLING AND SEALING SAME

(71) Applicant: Integrated Automation Systems, LLC, Bedford Heights, OH (US)

(72) Inventors: Michael Patrick McHugh, Solon, OH (US); Michael Eric Peters, Aurora, OH (US)

(73) Assignee: Integrated Automation Systems, LLC, Bedford Heights, OH (US)

( * ) Notice: Subject to any disclaimer, the term of this patent is extended or adjusted under 35 U.S.C. 154(b) by 189 days.

(21) Appl. No.: 15/162,934

(22) Filed: May 24, 2016

(65) Prior Publication Data

US 2016/0348419 A1 Dec. 1, 2016

Related U.S. Application Data

(60) Provisional application No. 62/168,090, filed on May 29, 2015.

(51) Int. Cl.
| *E06B 3/66* | (2006.01) |
| *E06B 3/677* | (2006.01) |
| *E06B 3/673* | (2006.01) |
| *E06B 3/663* | (2006.01) |

(52) U.S. Cl.
CPC ........ *E06B 3/6775* (2013.01); *E06B 3/67313* (2013.01); *E06B 3/6612* (2013.01); *E06B 3/66304* (2013.01); *Y02B 80/22* (2013.01); *Y02B 80/24* (2013.01)

(58) Field of Classification Search
CPC ... E06B 3/6612; E06B 3/66304; Y02B 80/22; Y02B 80/24
See application file for complete search history.

(56) References Cited

U.S. PATENT DOCUMENTS

| 2,680,269 A | * | 6/1954 | Watkins | E06B 3/4609 49/420 |
| 3,386,757 A | * | 6/1968 | Forward | B60R 13/0206 411/182 |
| 3,932,971 A | * | 1/1976 | Day | E06B 3/64 52/171.3 |
| 4,817,354 A | * | 4/1989 | Bayer | E06B 3/677 52/172 |
| 5,948,195 A | * | 9/1999 | Thomas | E06B 3/6775 156/107 |

(Continued)

FOREIGN PATENT DOCUMENTS

JP 2015-036354 A 2/2015

OTHER PUBLICATIONS

Definition of "oblong" from the internet, Apr. 15, 2018.*

*Primary Examiner* — Donald J Loney
(74) *Attorney, Agent, or Firm* — Kusner & Jaffe

(57) ABSTRACT

An insulating gas unit, and a method and apparatus for filling and sealing the insulating gas unit with an insulating gas, such as argon or krypton. The insulating glass unit includes a spacer frame having at least one elongated or oblong opening dimensioned to receive a gas filling nozzle. A mating elongated or oblong plug is dimensioned to be received within the opening in order to seal the insulating space of the insulating gas unit. A dimpling tool engages with the plug to form dimples that secure the plug in the opening.

9 Claims, 10 Drawing Sheets

(56) References Cited

U.S. PATENT DOCUMENTS

| | | | |
|---|---|---|---|
| 6,148,563 A * | 11/2000 | Roche | A47F 3/0434 49/501 |
| 2004/0060248 A1 * | 4/2004 | Tremblay | E06B 3/677 52/204.52 |

* cited by examiner

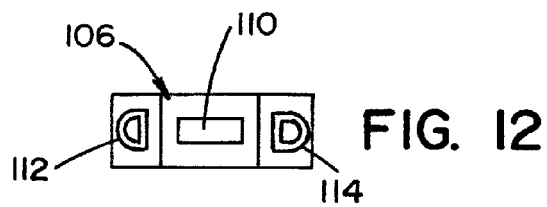
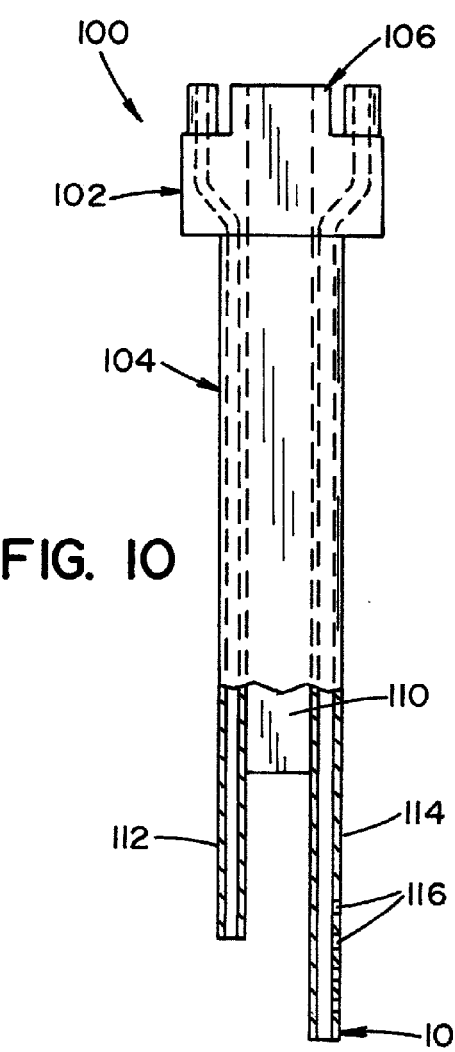
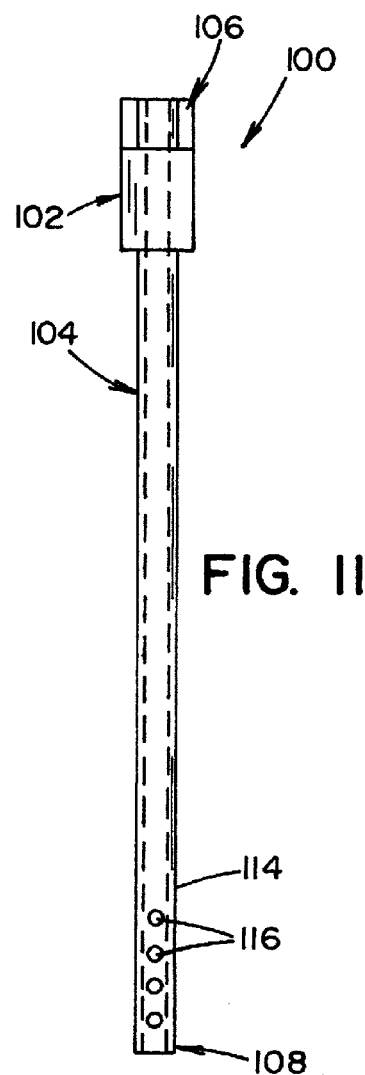
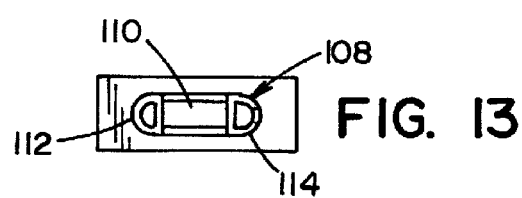

INSULATING GLASS UNIT AND A METHOD AND APPARATUS FOR FILLING AND SEALING SAME

RELATED APPLICATIONS

This application claims the benefit of U.S. Provisional Application No. 62/168,090, filed May 29, 2015, which is hereby fully incorporated herein by reference.

FIELD OF THE INVENTION

The present invention relates generally to the manufacture of insulating glass units, and more particularly to an insulating gas unit, and a method and apparatus for filling and sealing same.

BACKGROUND OF THE INVENTION

A typical insulating glass (IG) unit is generally comprised of two panes of glass separated by a metal spacer (also referred to as a spacer frame) that holds the two glass panes together, forming an insulating space therebetween. An insulating gas (e.g., argon, krypton, etc.) is injected into the insulating space between the two glass panes to provide the IG unit with desired insulating properties. One or two gas filling holes may be provided in the spacer that separates the two glass panes to facilitate filing of the insulating space with insulating gas.

The process of filling an IG unit with insulating gas can be a slow process, the speed of which is influenced by how quickly the volume of gas in the IG unit can be exhausted. Gas filling is done by one of two methods, namely, laminar or dilution filling.

Laminar filling is a method of filling the insulating space of the IG unit with insulating gas by means of a laminar flow. Two holes are needed in the spacer that is located between the two panes of glass, i.e., one hole located at the bottom of the spacer and one hole located at the top of the spacer. Insulating gas is injected through the bottom hole of the spacer in a laminar flow that induces a boundary layer between the insulating gas and the air located in the insulating space. As the insulating gas (which is heavier than air) fills the insulating space, it displaces the air that exits through the top hole of the spacer. The rate at which the insulating gas can be injected into the insulating space is determined by how fast air can be exhausted from the insulating space, as limited by a filling speed that prevents excess turbulence that will disrupt the laminar nature of the gas flow. A sensor "sniffs" the air and gas exhausted from the insulating space through the top hole to determine an insulating gas concentration. When the sensed insulating gas concentration reaches a predetermined concentration, the gas filling cycle ends.

Dilution filling is a method of filling the insulating space of the IG unit with insulating gas by injecting the insulating gas at a high fill rate that causes the insulating gas to mix with the air inside the insulating space, and exchange the air inside the insulating space with the insulating gas. Typically, dilution filling is done with a single hole located at the top of the spacer. By inserting the insulating gas into the insulating space through the hole in the top of the spacer, the insulating gas mixes with the air inside the insulating space. A sensor "sniffs" an insulating gas/air mixture exhausted from the insulating space through the hole in the spacer to determine the insulating gas concentration. When the insulating gas concentration reaches a required concentration, the gas filling cycle ends. Since dilution filling results in the mixing of the insulating gas and air inside the insulating space there is a significant waste of insulating gas. In this respect, it is usually necessary to fill the insulating space with a volume of insulating gas that is at least three times the volume of the insulating space in order to reach the required insulating gas concentration exhausted from the insulating space.

With each of the above-described gas filling methods, the determining factor of how fast an insulating space can be filled is related to how quickly the insulating gas can be injected into the insulating space. Although insulating gas can be inserted faster using the dilution filling method, as compared to the laminar filling method, the insulating gas can only be inserted as quickly as the gas/air mixture can be exhausted from the insulating space through the exhaust hole. A vacuum pump can be used assist to exhaust the gas/air mixture from the insulating space. In this respect, the vacuum pump induces a vacuum at the exhaust hole to draw the gas/air mixture out of the insulating space at an increased flow rate. With an increased flow rate for exhausting the gas/air mixture, the gas insertion flow rate can be increased. However, even with a perfect vacuum, the rate at which the gas/air mixture is exhausted from the insulating space is limited by the orifice size of the exhaust hole.

Holes are typically formed in a spacer by punching or drilling a 3 mm or 4 mm diameter round hole, depending upon the size/width of the spacer. The size of the hole is limited by the size/width of the spacer. Smaller spacer widths do not accommodate a larger hole, because the hole will consume most of the spacer width and decrease the structural integrity of the spacer. Larger sized holes can be punched/drilled, but only on wider spacers. However, since tooling is not easily changed, manufacturers typically select a hole size based on the smallest sized spacer being used. Thus, it is estimated that more than 95% of manufacturers currently employ tooling having a 3 mm or 4 mm diameter punch/drill. A much smaller percentage of manufacturers currently employ tooling providing a 5 mm diameter punch/drill to form 5 mm diameter round holes. Limits on hole size result in limits on the flow rate for exhausting air and gas from the insulating space.

In order to retain the insulating gas inside the insulating space after the filling process, it is necessary to properly seal the spacer hole(s). Currently, IG units are being commercially produced with spacers having conventional round gas filling holes, because plugs are known which close such spacer holes. These plugs serve multiple functions, namely, locking together the ends of an assembled spacer, and retaining the gas inside the insulating space in a marginally gas tight manner. At present, holes in the spacer are sealed with a plug taking the form of a screw or a closed end round rivet. Both of these types of plugs have drawbacks. In this respect, screws lack a reliable airtight seal, while rivets require special tools to install in the hole.

As a result of slow gas filling speeds, the gas filling step tends to become a bottleneck in the process of manufacturing IG units. These bottlenecks can become costly to manufacturers. To address this situation, manufacturers will often take a single flow of IG units off of a production line and route them through multiple gas filling stations. This is a labor intensive process, and a highly manual process, that is subject to quality and capacity variances.

The present invention provides a method and apparatus for filling and sealing insulating glass units that addresses these and other drawbacks currently existing in the field of IG unit manufacturing.

SUMMARY OF THE INVENTION

In accordance with the present invention, there is provided n insulating glass unit comprising: a spacer frame having at least one oblong opening formed therein; two panes of glass connected to opposite sides of a spacer frame to form an insulating space therebetween; and at least one oblong plug dimensioned to be received by the at least one oblong opening.

In accordance with another aspect of the present invention, there is provided a method for filling and sealing an insulating glass unit having an insulating space located between a pair of glass panes spaced apart by a spacer frame. The method comprising: forming an oblong-shaped opening in the spacer frame; inserting a gas filling nozzle through the opening to inject insulating gas into the insulating space; removing the gas filling nozzle from the opening after injection of the insulating gas; inserting an oblong-shaped plug into the opening to seal the insulating space; and securing the plug in the opening by forming one or more dimples in the plug.

In accordance with another aspect of the present invention, there is provided a dimpling tool for locking a plug within an opening to seal an insulating space of an insulating glass unit. The dimpling tool comprises: an engagement portion including: (a) a stem; and (b) a head located at a distal end of the stem and extending transverse thereto, wherein the head is comprised of: (i) a pair of opposing flat sides, and (ii) a pair of opposing convex curved sides.

In accordance with yet another aspect of the present invention, there is provided a gas filling nozzle for filling an insulating space of an insulating glass unit with insulating gas. The gas filling nozzle comprises: an interface portion adapted for fluid connection with a vacuum source, a pressure sensing device, and an insulating gas supply; and an insertion portion dimensioned to be inserted through an opening to the insulating space, wherein the insertion portion includes: (i) a vacuum tube fluidly connected to the vacuum source, (ii) a pressure monitor tube fluidly connected to the pressure sensing device, and (iii) a gas supply tube fluidly connected to the insulating gas supply.

An advantage of the present invention is the provision of an IG unit and a method and apparatus for filling and sealing same that allows for faster and lower cost manufacturing of IG units.

Another advantage of the present invention is the provision of an IG unit and a method and apparatus for filling and sealing same that improves retention of insulating gas within the insulating space of the IG unit.

Another advantage of the present invention is the provision of an insulating gas unit and a method and apparatus for filling and sealing same that reduces the amount of time needed to fill the insulating space of the IG unit with insulating gas.

Still another advantage of the present invention is the provision of an insulating gas unit and a method and apparatus for filling and sealing same that allows for increased automation of the gas filling process.

Still another advantage of the present invention is the provision of an insulating gas unit and a method and apparatus for filling and sealing same that provides an improved gastight seal of the insulating space.

Yet another advantage of the present invention is the provision of an insulating gas unit and a method and apparatus for filling and sealing same that allows for continuous inline processing and increased automation in the manufacture of IG units.

These and other advantages will become apparent from the following description of illustrated embodiments taken together with the accompanying drawings and the appended claims.

BRIEF DESCRIPTION OF THE DRAWINGS

The invention may take physical form in certain parts and arrangement of parts, embodiments of which will be described in detail in the specification and illustrated in the accompanying drawings which form a part hereof, and wherein:

FIG. 10 is a front plan view of a gas filling nozzle according to an embodiment of the present invention;

FIG. 11 is a side plan view of the gas filling nozzle shown in FIG. 10;

FIG. 12 is a plan view of a proximate end of the gas filling nozzle shown in FIG. 10;

FIG. 13 is a plan view of a distal end of the gas filling nozzle shown in FIG. 10;

DETAILED DESCRIPTION OF THE INVENTION

Figure 1:
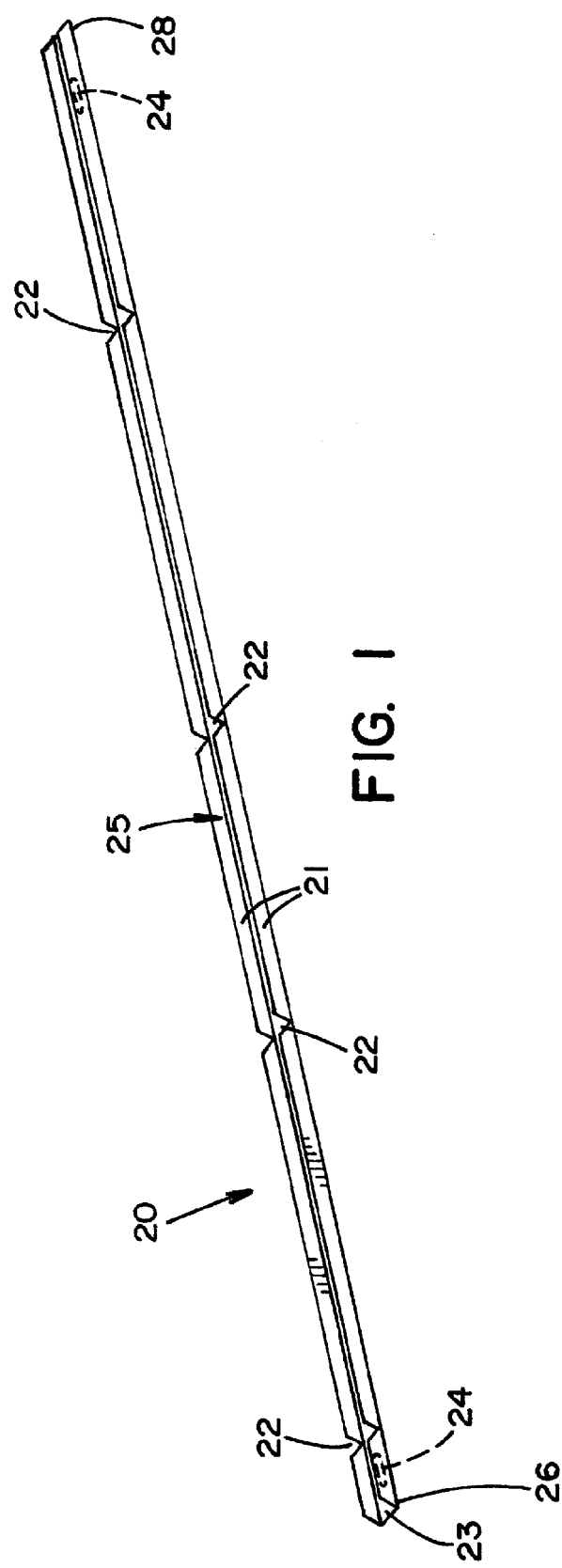
FIG. 1 is a perspective view of a spacer bar, according to an embodiment of the present invention, wherein the spacer bar is bendable into a spacer frame.
Figure 14:
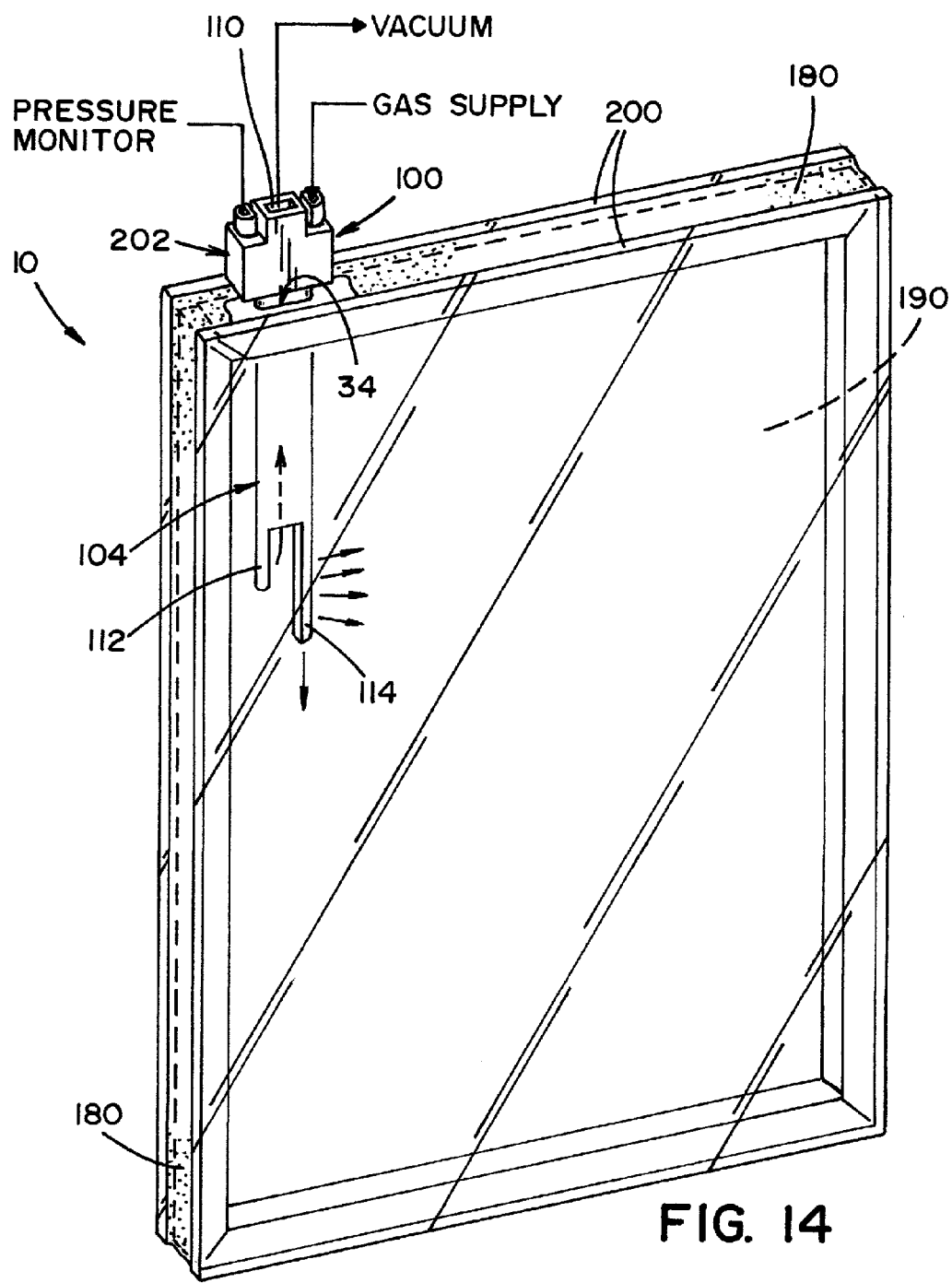
FIG. 14 is a perspective view of an integrated glass unit with the gas filing nozzle of FIG. 10 extending into the insulating space.

Referring now to the drawings wherein the showings are for the purposes of illustrating an embodiment of the invention only and not for the purposes of limiting same, FIG. 1 shows a U-shaped spacer bar 20, according to an embodiment of the present invention. Spacer bar 20 is bent to form a rectangular spacer frame 30 (FIGS. 2 and 3) of an IG unit 10 (FIG. 14). Spacer bar 20 is generally comprised of a pair of side walls 21 and a center wall 23. Walls 21 and 23 provide a U-shaped cross-section, and define an inner channel 25. A plurality of notches 22 are formed in side walls 21 to facilitate bending of spacer bar 20 in a spacer frame.

Figure 2:
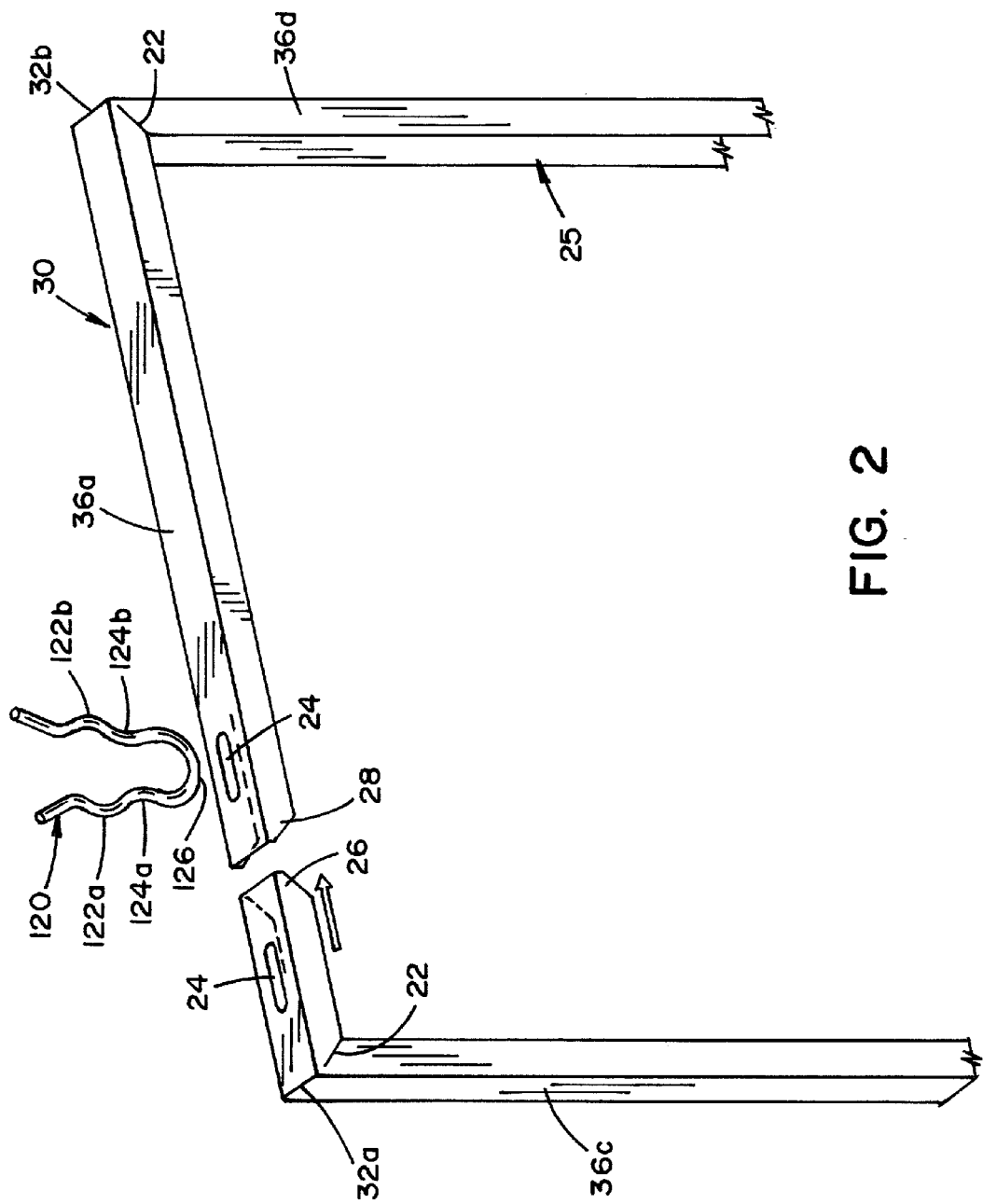
FIG. 2 is a perspective view of the two ends of the spacer bar shown in FIG. 1, as the spacer bar is assembled into the spacer frame, according to an embodiment of the present invention.

Furthermore, slots 24 are respectively formed in center wall 23 at first and second ends 26, 28 of spacer bar 20. In the illustrated embodiment, notches 24 are oval-shaped, and more specifically are stadium-shaped (i.e., a "discorectangle" consisting of a rectangle with semicircles at opposite ends), as best seen in FIG. 2. For example, slots 24 may have dimensions of approximately 3 mm (width)×12 mm (maximum length) or 4 mm (width)×12 mm (maximum length). It should be appreciated that the illustrated discorectangular shape of slots 24 is an exemplary shape according to an embodiment of the present invention. It is contemplated that slots 24 may also take the form of alternative elongated or oblong shapes (e.g., a rectangle). Spacer bar 20 may be made of such materials, including, but not limited to, stainless steel or tin plate steel.

Figure 3:
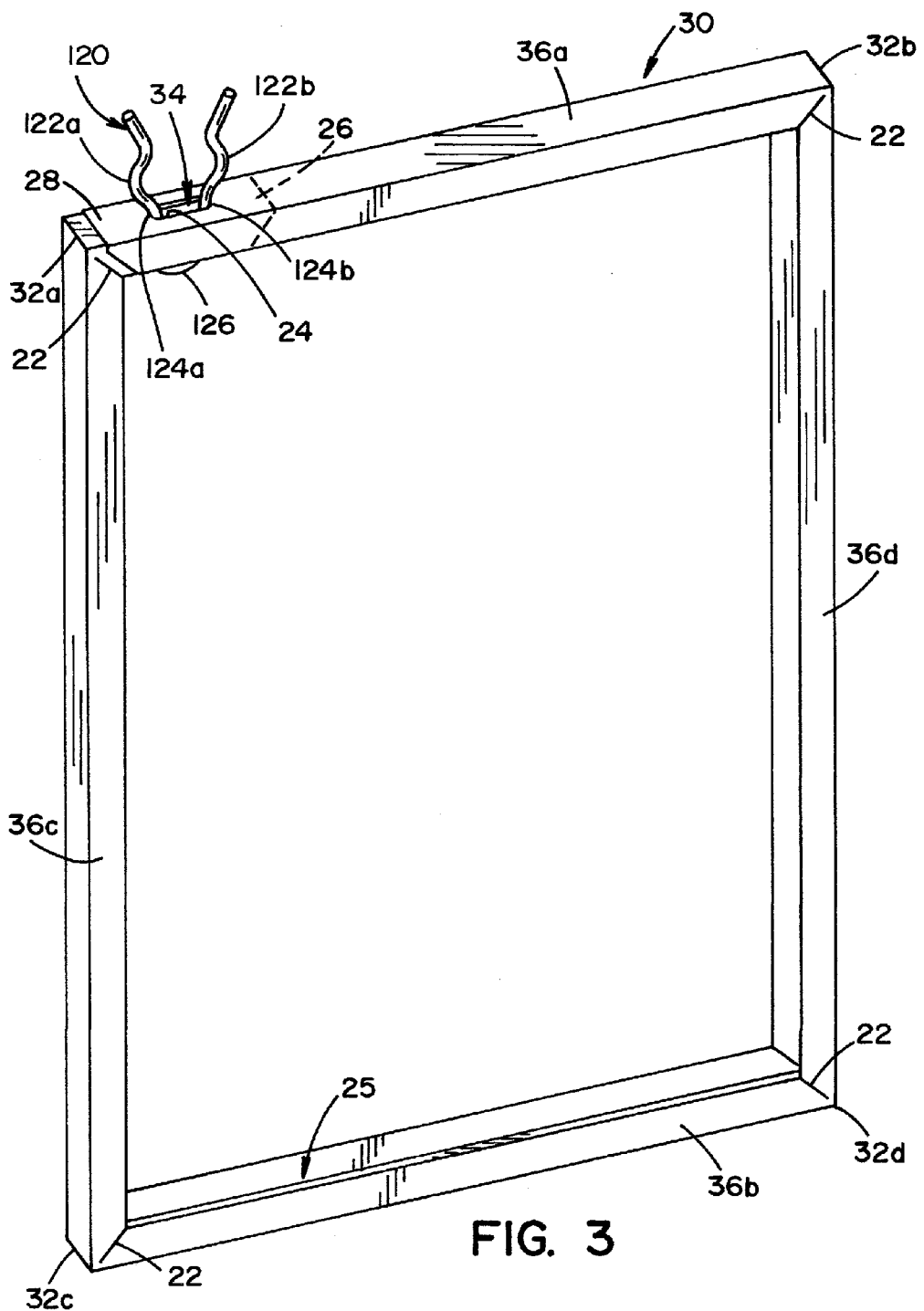
FIG. 3 is a perspective view of an assembled spacer frame with a retaining clip.

Spacer bar 20 shown in FIG. 1 is bent at notches 22 to form rectangular space frame 30 shown in FIGS. 2 and 3. Spacer frame 30 haste side sections 36a, 36b, 36c, 36d and corners 32a, 32b, 32c, 32d. First end 26 is joined to second end 28 by aligning slots 24 to form an opening 34. Thus, opening 34 has substantially the same shape and dimension as slots 24. As seen in FIG. 3, spacer frame 30 of the illustrated embodiment is rectangular-shaped having long sides 36c, 36d and short sides 36a, 36b. Channel 25 extends along the inner perimeter of spacer frame 30. It should be appreciated that while the present invention is described with reference to a rectangular-shaped spacer frame 30, it is contemplated that spacer frame 30 may be configured in alternative shapes to accommodate IG units of different shapes and dimensions.

In accordance with the present invention, an alignment clip 120 is provided to maintain alignment of slots 24 during assembly of IG unit 10 shown in FIG. 14. With reference to FIG. 2, alignment clip 120 is generally comprised of a pair of legs 122a and 122b that are connected to each other by a front end portion 126. Legs 122a and 122b are biased away from each other, but will flex toward each other when pinched together. Front end portion 126 is dimensioned to be inserted through opening 34 when legs 122a and 122b are pinched together. When legs 122a and 122b are released, the distance between legs 122a and 122b increases and thereby temporarily locks alignment clip 120 within opening 34, as shown in FIG. 3. When alignment clip 120 is locked within opening 34, respective engagement sections 124a, 124b of legs 122a, 122b engage with spacer frame 30. It will be appreciated that alignment clip 120 maintains alignment of slots 24 and keeps first end 26 connected to second end 28. Alignment clip 120 is removable from opening 34 by pinching legs 122a and 122b toward each other to release engagement sections 124a, 124b from engagement with spacer frame 30.

Figure 4:
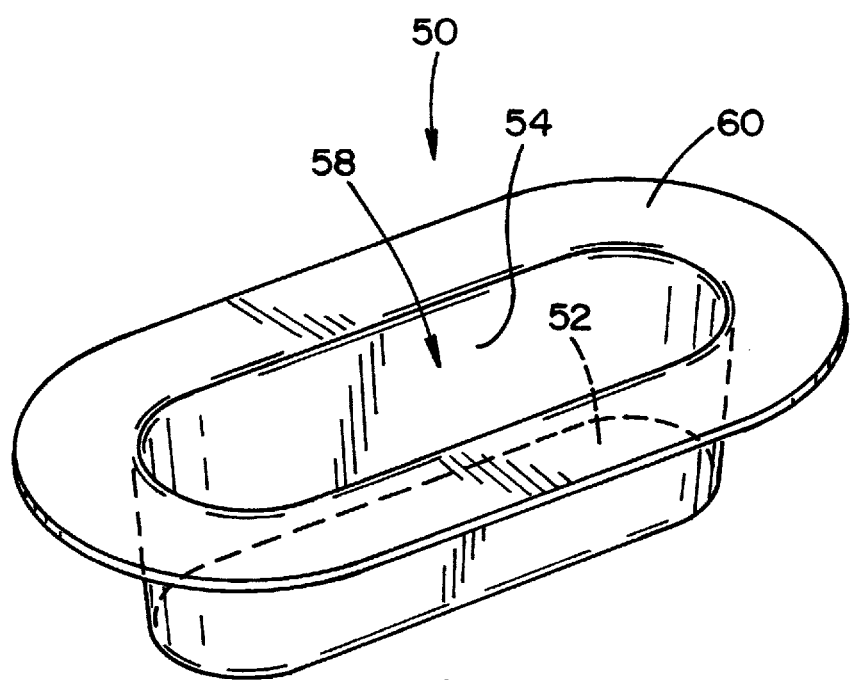
FIG. 4 is a perspective view of a plug according to an embodiment of the present invention, wherein the plug seals an insulating space of an insulating glass unit.
Figure 5:
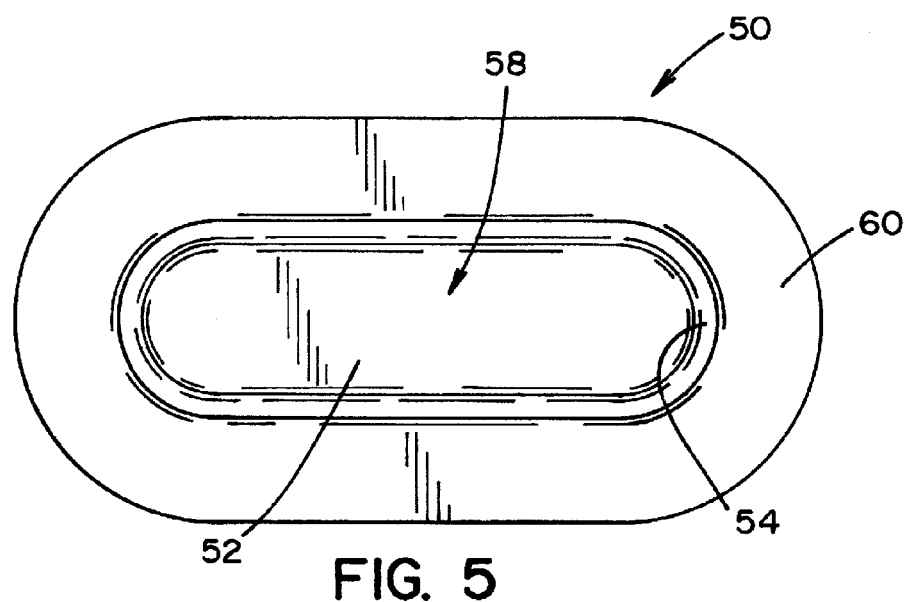
FIG. 5 is a top plan view of the plug shown in FIG. 4.
Figure 6:
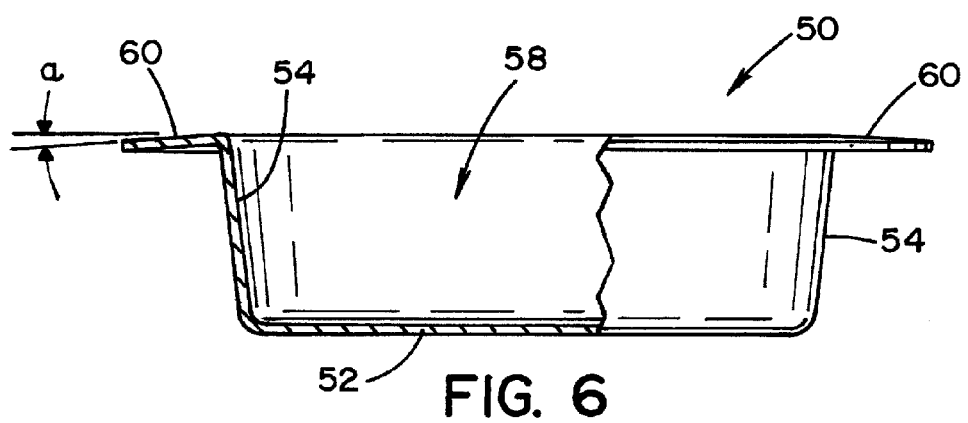
FIG. 6 is a partial cross-sectional side view of the plug shown in FIG. 5.
Figure 8:
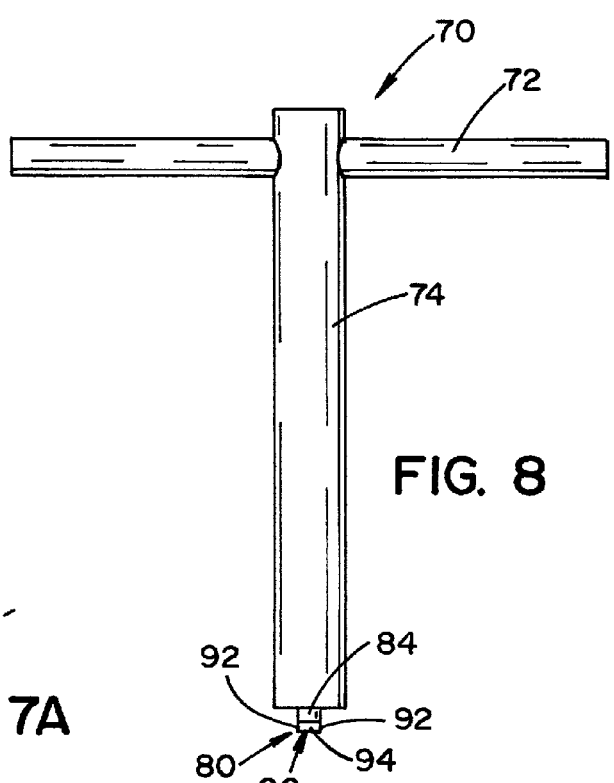
FIG. 8 is a side plan view of the dimpling tool shown in FIG. 7.

FIGS. 4-6 show a plug 50 according to an embodiment of the present invention. Plug 50 is dimensioned to be press fit into opening 34 to seal insulating space 190 of IG unit 10, as will be described with reference to FIGS. 15-17. Plug 50 has an oblong-shaped bottom wall 52, an annular oblong-shaped side wall 54 extending upward from bottom wall 52, and an annular flange 60 extending outward from the upper end of side wall 54. The shape and dimensions of bottom wall 52 and side wall 54 are substantially the same as opening 34.

In the illustrated embodiment bottom wall 52 is stadium-shaped (i.e., a "discorectangle" consisting of a rectangle with semicircles at opposite ends) and side wall 54 has a matching stadium-shaped cross-section that is tapered such that the perimeter of side wall 54 decreases from the upper end of side wall 54 to the bottom end of side wall 54, as seen in FIG. 6. An inner recess 58 is defined by bottom wall 52 and side wall 54. According to an alternative embodiment of the present invention, side wall 54 of plug 50 is not tapered, and thus has a substantially constant perimeter from the upper end of side wall 54 to the bottom end of side wall 54.

In the illustrated embodiment flange 60 is angled relative to the horizontal to provide a spring action when plug 50 is fully inserted into opening 34. This spring action provides an improved seal of opening 34. As seen in FIG. 6, angle α of flange 60 is in the range of approximately 1-5 degrees, and preferably about 3 degrees.

Plug 50 is preferably made of a metal, such as stainless steel or tin plate steel. It is contemplated that the plug 50 may be dimensioned to be received within elongated or oblong openings of various shapes and dimensions, including but not limited to, dimensions of approximately 3 mm×12 mm, 4 mm×12 mm, 3 mm×10 mm, and 5 mm×12 mm ("width×maximum length"). It is also contemplated that in accordance with an alternative embodiment, plug 50 may be shaped and dimensioned to seal a conventional round gas filling hole.

Figure 7:
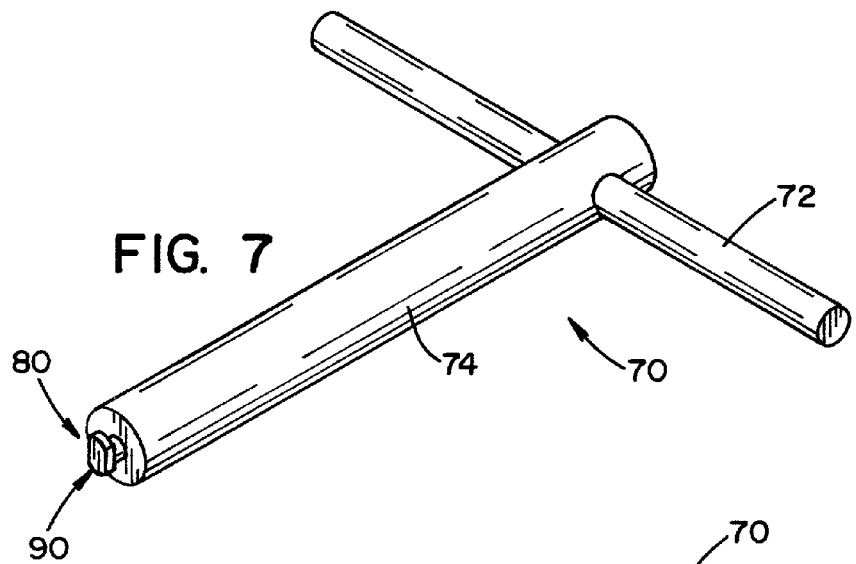
FIG. 7 is a perspective view of a dimpling tool according to an embodiment of the present invention, wherein the dimpling tool includes an engagement portion.
Figure 7A:
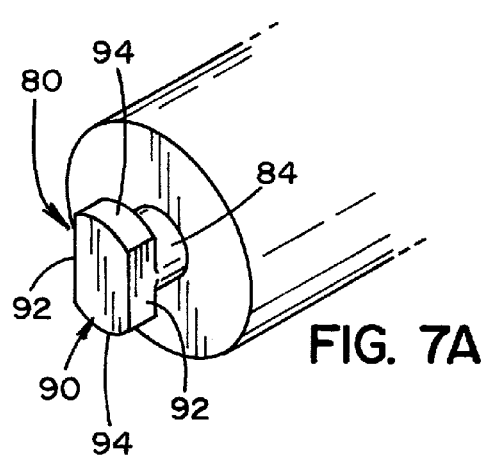
FIG. 7A is an enlarged view of the engagement portion of the dimpling tool shown in FIG. 7
Figure 9:
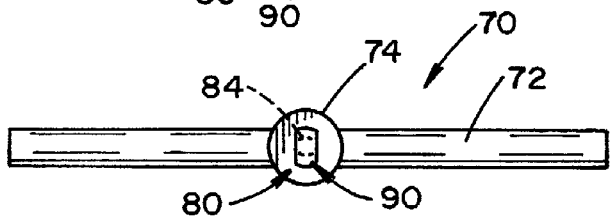
FIG. 9 is a bottom plan view of the dimpling tool shown in FIG. 7.

Referring now to FIGS. 7, 7A, 8 and 9, there is shown a dimpling tool 70 according to an embodiment of the present invention. Dimpling tool 70 is used to form one or more dimples in side wall 54 of plug 50 in order to lock plug 50 in opening 34, as will be described in detail below. Dimpling tool 70 is generally comprised of a handle bar 72, a rod 74, and a T-shaped engagement portion 80. In the illustrated embodiment, handle bar 72 extends through an opening formed at the upper end of rod 74 to provide a handle portion adapted to be gripped by a user to rotate dimpling tool 70, as will be described below. Engagement portion 80 extends outward from the lower end of rod 74. Engagement portion 80 includes a stem 84 and a head 90 located at the distal end of stem 84 and extending transverse thereto, as best seen in FIG. 7A. Head 90 includes a pair of elongated flat sides 92 and a pair of convex curved sides 94. Curved sides 94 provide contact surfaces for forming dimples in side wall 54 of plug 50, as will be discussed below.

It should be understood that dimpling tool 70 is intended for "manual" user operation (i.e., rotation by hand). However, it is contemplated that engagement portion 80 may also be formed at a distal end of a conventional drill bit for use with a power tool. Operation of the power tool may be automated by a computer control unit that controls an automated assembly process.

FIGS. 10-13 show a gas filling nozzle 100 according to an embodiment of the present invention. Gas filling nozzle 100 is adapted for filling insulating space 190 of IG unit 10 with insulating glass through opening 34 of spacer frame 30. Gas filling nozzle 100 is generally comprised of an interface portion 102 and an insertion portion 104. Interface portion 102 is adapted for fluid connection (via hoses) with a vacuum source (not shown), a pressure sensing device (not shown), and an insulating gas supply (not shown), such as an argon or a krypton gas supply. Insertion portion 104 is dimensioned to be inserted through opening 34 of spacer frame 30, as shown in FIG. 14.

Insertion portion 104 includes a vacuum tube 110, a pressure monitor tube 112, and a gas supply tube 114. In the illustrated embodiment, gas supply tube 114 includes a plurality of side orifices 116 at distal end 108 of nozzle 100. Vacuum, pressure monitoring, and gas supply channels are defined by tubes 110, 112, and 114. Corresponding channels also extend through interface portion 102. Accordingly, continuous fluid conduits are provided for vacuum, pressure monitoring, and gas supply between the proximate end 106 and the distal end 108 of nozzle 100, as seen in FIGS. 10 and 11. In the illustrated embodiment, outer surfaces of tubes 110, 112, and 114 define an oblong shape that matches the shape and dimensions of opening 34, as best seen in FIGS. 13 and 14.

Referring now to FIGS. 14-17, a method of assembling, filling, and sealing insulating glass unit 10 according to an embodiment of the present invention will now be described. It should be understood that IG unit 10 is an exemplary IG unit that is generally comprised of two glass panes 200 separated by spacer frame 30 that holds the two glass panes 200 together, thereby forming an insulating space 190 therebetween.

Beginning with assembly of spacer frame 30, spacer bar 20 (FIG. 1) is shaped into spacer frame 30 by bending the spacer bar 20 at notches 22 to form right-angle corners 32a, 32b, 32c, 32d of spacer frame 30 (FIGS. 2 and 3). Slots 24, formed at opposite ends 26, 28 of the spacer bar 20, are aligned to form opening 34. Thereafter, alignment clip 120 may be optionally locked within opening 34 to connect ends 26, 28 and to maintain slots 24 in alignment (FIG. 3). Next, a sealant 180 (such as hot melt butyl) is applied to the outer surface of spacer frame 30, except in the vicinity of opening 34, as best seen in FIG. 14.

A pair of glass panes 200 are positioned at opposite sides of spacer frame 30. Thereafter, glass panes 200 are pressed against spacer frame 30 while heating in an oven, as is known to those skilled in the art.

After completion of this portion of the assembly process, alignment clip 120 is removed from opening 34, and insertion portion 104 of gas filing nozzle 100 is inserted through opening 34 into insulating space 190 (FIG. 14). Interface portion 102 of nozzle 100 is fluidly connected with (i) a vacuum source, (ii) a pressure sensing device, and (iii) a supply of insulating gas (e.g., argon or krypton gas). Accordingly, insulating gas is injected into the insulating space 190 via gas supply tube 114. Simultaneously, a vacuum is applied through vacuum tube 110 to draw air and gas out of insulating space 190, and the pressure sensing device monitors the pressure in insulating space 190 via pressure monitor tube 112.

A computer control unit (not shown) is provided to control the flow of insulating gas through gas supply tube 114, control the vacuum applied via vacuum tube 110, and to analyze data obtained by the pressure sensing device. It is desirable to apply as large a vacuum as possible, but always maintain a slightly positive pressure in insulating space 190 by rapidly adjusting the flow of incoming gas via gas supply tube 114. The air and gas removed from insulating space 190 via vacuum tube 110 is fed to a conventional gas analyzer (not shown) to monitor the gas concentration. Data from the gas analyzer is supplied to the computer control unit.

A gas filling operation is completed after a predetermined insulating gas concentration is reached in insulating space 190 that achieves a desired insulating property for IG unit 10. After the gas filling operation is completed, gas filling nozzle 100 is removed from opening 34 and plug 50 is rapidly press fit into opening 34 to seal insulating space 190. The spring action of flange 60 of plug 50 provides a tight seal around opening 34.

Figure 15:
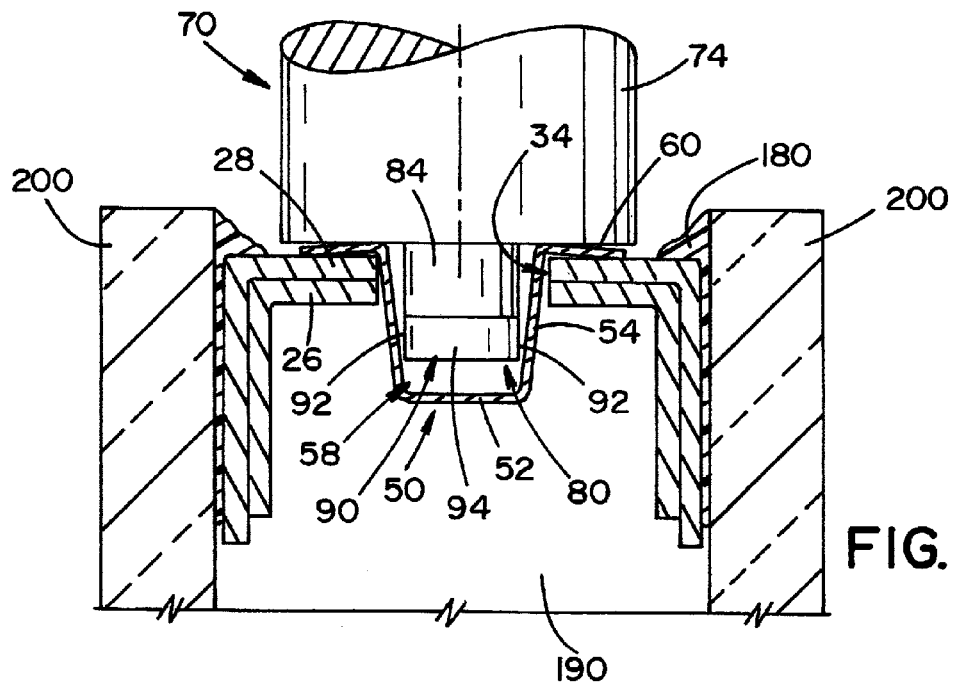
FIGS. 15 and 16 illustrate operation of the dimpling tool to form dimples in the plug to lock the plug within an opening in the spacer frame.
Figure 16:
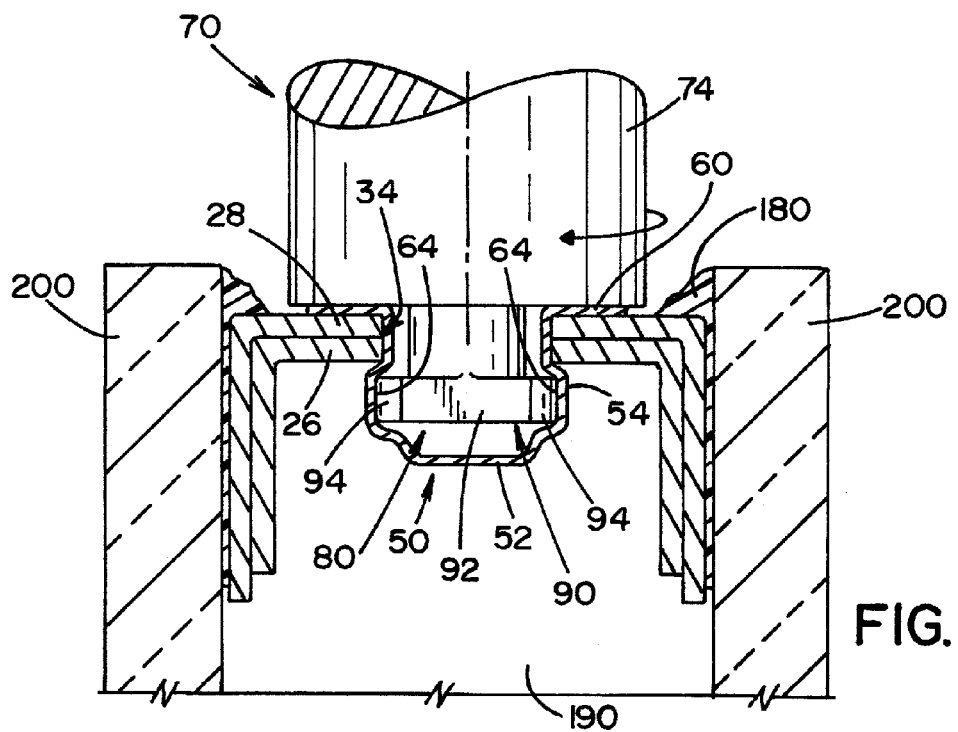
Figure 17:
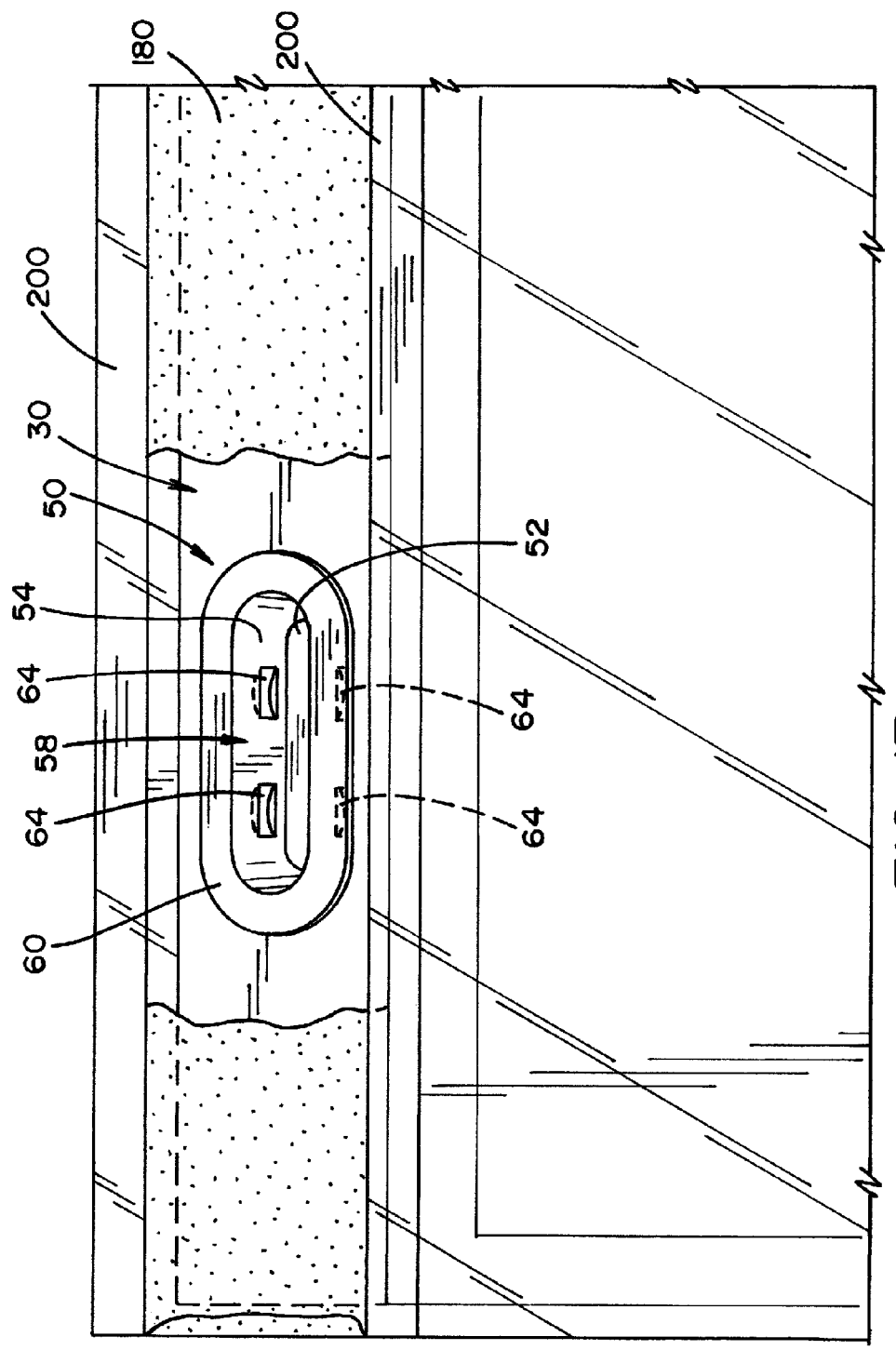
FIG. 17 shows the plug with multiple dimples formed therein.

With reference to FIG. 15, engagement portion 80 of dimpling tool 70 is inserted into recess 58 of plug 50, such that the front face of rod 74 contacts the top face of flange 60. Engagement portion 80 is oriented in recess 58 such that elongated flat sides 92 of head 90 are generally aligned with the longitudinal direction of recess 58, as shown in FIG. 15. Next, dimpling tool 70 is rotated approximately 90 degrees to respectively engage the pair of convex curved sides 94 of head 90 with opposing inner surfaces of side wall 54 to thereby form a pair of dimples 64 therein (FIG. 16). Since the distance between the pair of convex curved sides 94 is greater than the distance between the opposing inner surfaces of side wall 54, the convex curved side walls 94 will cause two opposite facing portions of side wall 54 to bulge outward during rotation of dimpling tool 70, thereby forming a pair of opposite facing dimples 64, as best seen in FIG. 17. Dimples 64 lock plug 50 within opening 34, as best seen in FIG. 16. Locking of plug 50 within opening 50 prevents removal of plug 50 from opening 34, fastens end 26 to end 28, and closes opening 34 to seal insulating space 190.

Dimpling tool 70 is removed from recess 58 by again rotating dimpling tool 70 approximately 90 degrees. It will be appreciated that a second pair of opposite facing dimples 64 can be formed by repeating the steps described above at a second position within recess 58. FIG. 17 illustrates a plug 50 that is secured within opening 34 by formation of first and second pairs of opposite facing dimples 64 using dimpling tool 70 in the manner described above.

After completing formation of dimples 64 and removing dimpling tool 70 from recess 58, additional sealant 180 is applied to spacer frame 30 over plug 50 and the region surrounding plug 50. Sealant 180 minimizes gas and moisture transmission through opening 34.

It should be appreciated that the present invention provides significant advantages over the prior art. In this respect, the elongated or oblong shape of the opening in the spacer frame increases the area of the opening, without increasing the width of the opening. As a result, more gas and air can flow through the opening than in prior art IG units. This allows the gas filling process to be completed in a shorter period of time, thereby increasing the manufacturing speed of IG units. With a larger opening area, it is also easier to automate the gas filling process. In this respect, there is a greater margin of error for misalignment of the slots forming the opening, and a greater margin of error for misalignment of the gas filling nozzle with the opening.

The foregoing describes specific embodiments of the present invention. It should be appreciated that these embodiments are described for purposes of illustration only, and that numerous alterations and modifications may be practiced by those skilled in the art without departing from the spirit and scope of the invention. For example, the present invention has been illustrated by an IG unit having a single opening in the spacer frame for gas filling. However, the IG unit may include a plurality of openings in the spacer frame for gas filling. It is intended that all such modifications and alterations be included insofar as they come within the scope of the invention as claimed or the equivalents thereof.

Having described the invention, the following is claimed:

1. An insulating glass unit comprising:
a spacer frame having an oblong opening formed therein;
two panes of glass connected to opposite sides of the spacer frame to form an insulating space therebetween;
an insulating gas injected into the insulating space through the oblong opening; and
an oblong plug dimensioned to be received by the oblong opening to seal the insulating gas within the insulating space, wherein the oblong plug includes:
an oblong-shaped bottom wall;
an annular oblong-shaped side wall extending upward from the bottom wall, wherein the bottom wall and the side wall define an inner recess; and
a flange extending from the upper end of the side wall, wherein the flange is bent at an angle of 1-5 degrees from horizontal to provide a spring action when the oblong plug is fully inserted into the oblong opening, said spring action of the flange providing a seal around the opening.

2. An insulating glass unit according to claim 1, wherein said oblong opening has a width less than 4 mm and a maximum length less than 12 mm.

3. An insulating glass unit according to claim 1, wherein said oblong opening is discorectangle-shaped.

4. An insulating glass unit according to claim 1, wherein the bottom wall and side wall are discorectangle-shaped.

5. An insulating glass unit according to claim 1, wherein a cross-section of the side wall is tapered such that a perimeter of the side wall decreases from the upper end of the side wall to a bottom end of the side wall.

6. An insulating glass unit according to claim 1, wherein said insulating glass unit includes a plurality of said oblong openings and a plurality of said oblong plugs.

7. An insulating glass unit according to claim 1, wherein the oblong opening is dimensioned to receive an insertion portion of a gas filling nozzle for injecting the insulating gas into the insulating space.

8. An insulating glass unit according to claim 7, wherein the insertion portion comprises at least one tube wherein the outer surfaces of the at least one tube define an oblong shape that matches a shape and dimensions of the oblong opening.

9. An insulating glass unit according to claim 1, wherein one or more dimples are formed in the side wall to lock the oblong plug in the oblong opening.

* * * * *